US010649697B2

(12) United States Patent
Hasegawa et al.

(10) Patent No.: US 10,649,697 B2
(45) Date of Patent: May 12, 2020

(54) TECHNIQUE FOR PROVIDING INFORMATION ON TIME TO READ A FILE

(71) Applicant: International Business Machines Corporation, Armonk, NY (US)

(72) Inventors: Tohru Hasegawa, Tokyo (JP); Hiroshi Itagaki, Yokohama (JP); Shinsuke Mitsuma, Machida (JP); Terue Watanabe, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 14/887,404

(22) Filed: Oct. 20, 2015

(65) Prior Publication Data

US 2016/0139824 A1    May 19, 2016

(30) Foreign Application Priority Data

Nov. 19, 2014  (JP) .................................. 2014-234793

(51) Int. Cl.
*G06F 12/00*   (2006.01)
*G06F 3/06*    (2006.01)

(52) U.S. Cl.
CPC .......... *G06F 3/0686* (2013.01); *G06F 3/0605* (2013.01); *G06F 3/0653* (2013.01); *G06F 3/0682* (2013.01)

(58) Field of Classification Search
None
See application file for complete search history.

(56) References Cited

U.S. PATENT DOCUMENTS

| 8,954,663 B1* | 2/2015 | Klein .................... G06F 3/0619 711/111 |
| 2001/0013084 A1* | 8/2001 | Barve ................... G06F 3/0613 711/113 |
| 2012/0323934 A1 | 12/2012 | Amir et al. |

(Continued)

FOREIGN PATENT DOCUMENTS

| JP | 05241736 A | 9/1993 |
| JP | 07122041 A | 5/1995 |

(Continued)

OTHER PUBLICATIONS

IBM, "Linear Tape File System (LTFS) Format Specification", LTFS Format Version 2.0.1, Aug. 17, 2011, pp. 1-71.

(Continued)

*Primary Examiner* — Baboucarr Faal
(74) *Attorney, Agent, or Firm* — Michael A. Petrocelli

(57) ABSTRACT

An information providing system and method, including a computer, for providing time taken to read a file, which includes an acquisition unit. The acquisition unit obtains information on a recording position of a file when the file is recorded in a storage device. A recording unit writes information on the obtained recording position to an index referred to access the file. A calculation unit calculates time taken to read the file using the information on the recording position written to the index in response to a request to obtain the time taken to read the file, and providing the calculated time to a requester that requests the time.

20 Claims, 8 Drawing Sheets

(56) References Cited

U.S. PATENT DOCUMENTS

| | | | | |
|---|---|---|---|---|
| 2015/0149415 A1* | 5/2015 | Iwanaga | ............ | G06F 11/1469 707/684 |
| 2015/0347034 A1* | 12/2015 | Whitney | ............ | G11B 5/00817 711/111 |
| 2018/0059959 A1 | 3/2018 | Hasegawa et al. | | |

FOREIGN PATENT DOCUMENTS

| | | | |
|---|---|---|---|
| JP | 2002197842 | A | 7/2002 |
| JP | 2007018716 | A | 1/2007 |
| JP | 2008165862 | A | 7/2008 |
| JP | 2016099728 | A | 5/2016 |
| WO | 2010035617 | A1 | 4/2010 |
| WO | 2010073776 | A1 | 7/2010 |

OTHER PUBLICATIONS

Ling et al., "Migrate device control applications from Windows to Linux", IBM developerWorks®, Jun. 24, 2008, pp. 1-10.
IBM, "SCSI Reference", IBM® TotalStorage® LTO Ultrium Tape Drive, Feb. 13, 2013, GA32-0928-01, pp. 1-514.
IBM, "Installation and User's Guide", IBM Tape Device Drivers, 21st Edition, Nov. 2014, GC27-2130-20, pp. 1-334.
Japanese Application No. 2014-234793, Filed Nov. 19, 2014, entitled: System, Method, and Program for Providing Information, pp. 1-39.
Pending U.S. Appl. No. 15/988,044, filed May 24, 2018, entitled: "Writing Files to Multiple Tapes", pp. 1-40.

\* cited by examiner

```xml
<file>
<name>1602970955472708845-158631471873209913920-1220527651-39687-0</name>
<length>185504</length>
<readonly>false</readonly>
<creationtime>2013-12-17T06:45:19.4298872747</creationtime>
<changetime>2013-12-17T06:52:02.3091093932</changetime>
<modifytime>2013-12-17T06:52:02.2466446917</modifytime>
<accesstime>2013-12-17T06:45:19.4298872747</accesstime>
<backuptime>2013-12-17T06:45:19.4298872747</backuptime>
<fileuid>7</fileuid>
<extendedattributes>
<xattr>
<key>AAA.ltfs.bbb.path</key>
<value>/AAA/bbb7/ccc.eee</value>
</xattr>
</extendedattributes>
<extentinfo>
<extent>
<fileoffset>0</fileoffset>
<partition>b</partition>
<startblock>39</startblock>
<byteoffset>0</byteoffset>
<bytecount>185504</bytecount>
<startwrap>5</startwrap>
<startlpos>295332</startlpos>
<endwrap>5</endwrap>
<endlpos>393734</endlpos>
</extent>
</extentinfo>
</file>
```

FIG. 5

TECHNIQUE FOR PROVIDING INFORMATION ON TIME TO READ A FILE

BACKGROUND

The present invention relates to a system and a method for providing information on the time taken to read a file, as well as a program for executing the method.

Examples of a storage device for storing data include a solid state drive (SSD), a hard disk drive (HDD), and a magnetic tape medium (hereinafter simply referred to as tape). The storage device stores data as a file. The file is managed with a file system using information (metadata) on the file as an index.

If a tape is used as a storage device, for example, a linear tape file system (LTFS) is used as the file system. When a file is recorded on a tape in the LTFS format, it takes several minutes to scan the tape from one end to the other end because tape is a long recording medium extending in one direction, and thus read time varies significantly depending on the recording position of the file on the tape.

Internet Explorer® provided by Microsoft® obtains the time taken to transfer a file by measuring a file transfer rate after starting the transfer and dividing the size of the file by the transfer rate and provides information on the time by means of display or the like.

In the case of tape, the time for a reading head to move to a file recording position on the tape (seek time) is needed before file transfer is started, during which the time taken for the transfer cannot be updated. Furthermore, with the LTFS, if data is added to the tape, fragments of the data are separately recorded on a plurality of positions of the tape. Thus, the LTFS reads the data while seeking all the fragments. This makes it difficult to predict the time from the start of reading the file to the end thus making it impossible to provide correct read time.

To predict the time taken to read a file on a tape, a method for calculating the time taken to read data recorded on a tape in a tape library has been proposed (for example, see PCT International Publication No. WO2010/035617).

SUMMARY

When a file is recording on a tape in the LTFS format, an index, which is information on the file, is also recorded on the tape. The index includes file name, data size, record time, etc. The recording position of the file on the tape is indicated by a position in a longitudinal direction of the tape (hereinafter referred to as LPOS) and a position in a lateral direction perpendicular to the longitudinal direction (hereinafter referred to as Wrap). A tape drive reads and writes data on the basis of Wrap and LPOS, but the LTFS does not detect at which Wrap and LPOS the file is recorded. Thus, to calculate the time taken to read a file in a tape, the method disclosed in PCT International Publication No. WO2010/035617, needs to mount the tape and obtain positional information on the file recorded in the tape and, for data recorded at intervals due to addition, the method cannot disadvantageously provide correct read time, as described above.

In one embodiment according to the invention, an information providing system, including a computer, provides time taken to read a file. The information providing system includes an acquisition unit which obtains information on a recording position of a file when the file is recorded in a storage device. A recording unit writes information on the obtained recording position to an index referred to access the file. A calculation unit calculates time taken to read the file using the information on the recording position written to the index in response to a request to obtain the time taken to read the file, and providing the calculated time to a requestor that requests the time.

In another embodiment according to the invention, a method executed by an information providing system for providing time taken to read a file, includes: obtaining information on a recording position of a file when the file is recorded in a storage device; writing information on the obtained recording position to an index referred to access the file; and calculating time taken to read the file using the information on the recording position written to the index in response to a request to obtain the time taken to read the file; and providing the calculated time to a requestor that requests the time taken to read the file.

In another embodiment according to the invention, a computer program product provides time taken to read a file. The computer program product comprising a computer readable storage medium having program instructions embodied therewith, and the program instructions executable by a computer to cause the computer to perform a method, comprising: obtaining information on a recording position of a file when the file is recorded in a storage device; writing information on the obtained recording position to an index referred to access the file; calculating time taken to read the file using the information on the recording position written to the index in response to a request to obtain the time taken to read the file; and providing the calculated time to a requestor that requests the time taken to read the file.

BRIEF DESCRIPTION OF THE SEVERAL VIEWS OF THE DRAWINGS

FIG. 5 is a diagram showing an example of an index to which information on an obtained recording position.

DETAILED DESCRIPTION

When a file is recording on a tape in the LTFS format, an index, which is information on the file, is also recorded on the tape. The index includes file name, data size, record time, etc. The tape library connects to a server unit. The server unit that has received a read request or a write request reads or writes the file from or to the tape library. At that time, the tape is mounted so that an application implemented in the server unit can use the file on the tape with the LTFS. When the tape is mounted, the server unit reads an index for use with the LTFS from the tape and stores the index in a cache of the server unit.

Figure 1:
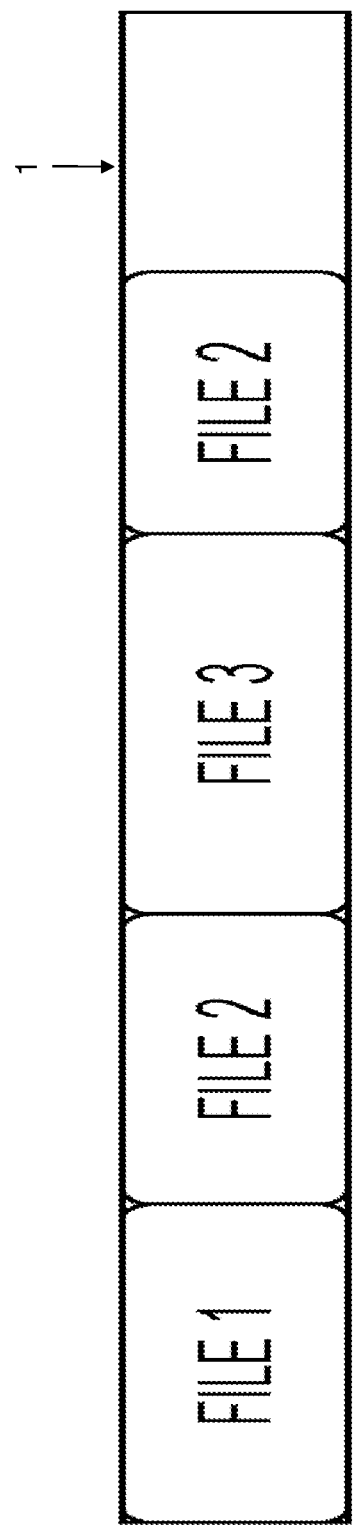
FIG. 1 is a diagram illustrating an example of the layout of files recorded on a tape.

Referring to FIG. 1, with the LTFS format, if a tape 1 to which a file 2 is added has a file 3 recorded on it, a fragment of data in the file 2 is recorded following a file 3, as shown in FIG. 1. Thus, the file 2 is placed at intervals on the tape 1. Information on the fragment of the data is recorded in a predetermined area called "extent" provided in the index. The extent stores, as information on the fragment of the data, the offset of the fragment in the file, the block number on the tape, the byte count, etc. The block number is a sequential number on the tape but does not indicate the recording position of the file on the tape.

The recording position of the file on the tape is indicated by a position in a longitudinal direction of the tape (hereinafter referred to as LPOS) and a position in a lateral direction perpendicular to the longitudinal direction (hereinafter referred to as Wrap). A tape drive reads and writes data on the basis of Wrap and LPOS, but the LTFS does not detect at which Wrap and LPOS the file is recorded.

Thus, to calculate the time taken to read a file in a tape, the method disclosed in PCT International Publication No. WO2010/035617 needs to mount the tape and obtain positional information on the file recorded in the tape and, for data recorded at intervals due to addition, the method cannot disadvantageously provide correct read time, as described above.

In view of the above problems, the embodiments of the present invention provide an information providing system for providing time taken to read a file. The system includes acquisition means, embodied as an acquisition unit, for obtaining information on a recording position of a file when the file is recorded in a storage device. A recording means, embodied as a recording unit, for writing information on the obtained recording position to an index referred to access the file. A calculation means, embodied as a calculation unit, for calculating time taken to read the file using the information on the recording position written to the index in response to a request to obtain the time taken to read the file and providing the calculated time to a requestor that requests the time.

The embodiments of the present invention allow provision of correct time taken to read a file recorded on a storage device without the need for accessing the storage device as the need arises.

Figure 2:
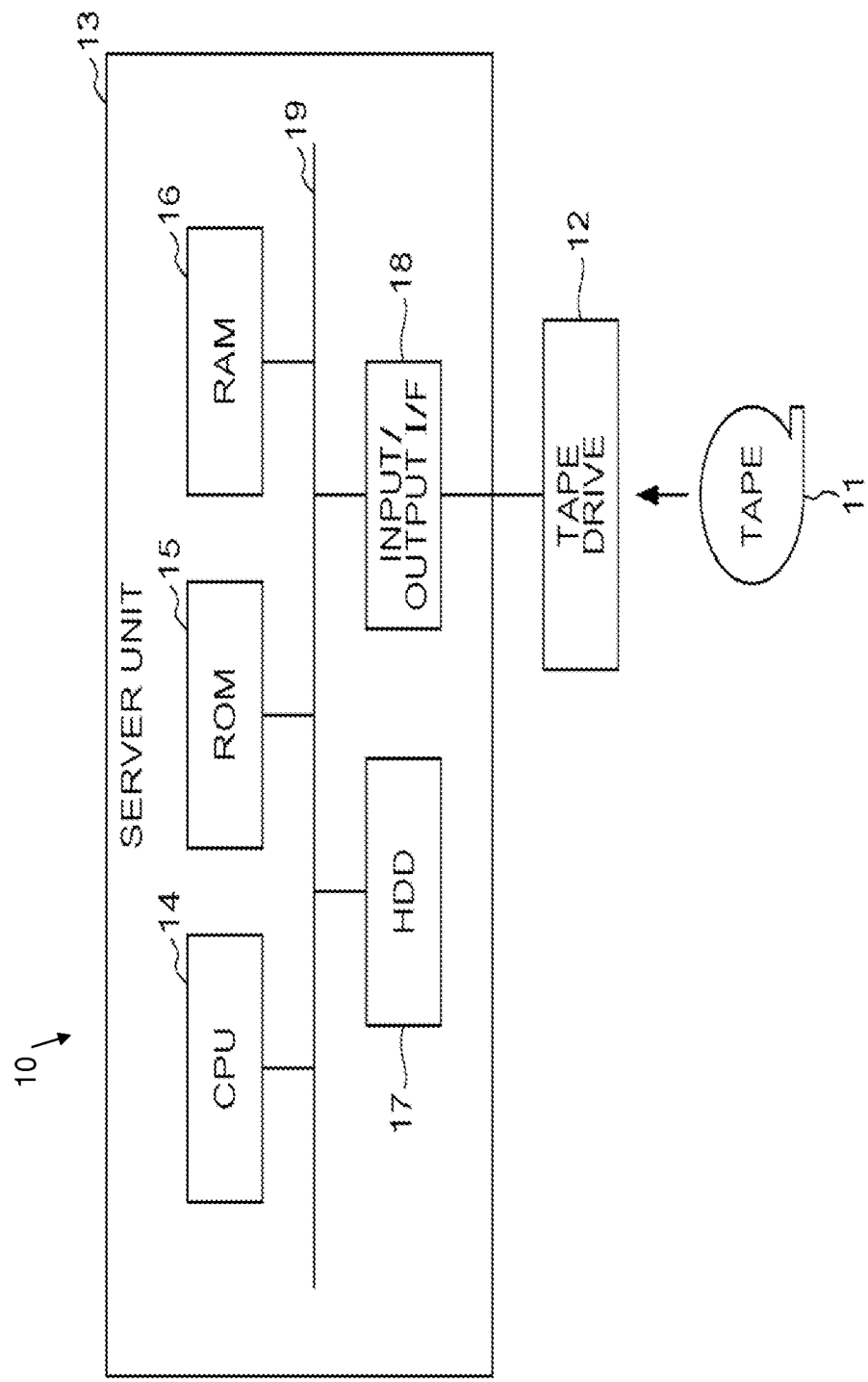
FIG. 2 is a diagram showing a configuration example of an information providing system.

Although the present invention will be described based on specific embodiments shown in the drawings, the present invention is not limited thereto. FIG. 2 is a diagram showing a configuration example of an information providing system 10. The information providing system 10 calculates the time taken to read a file in response to a read-time acquisition request and provides the calculated read time. This time can be presented to a user on a display or the like.

The information providing system 10 includes a storage device for recording files and an information processing unit that calculates the time taken to read a file from the storage device and provides the calculated time. In FIG. 2, the storage device includes a tape 11 and a tape drive 12 that reads and writes a file from/to the tape 11, and the information processing unit is a server unit 13 connected to the tape drive 12. This configuration is given for mere illustration and is not intended to limit the present invention.

Thus, the storage device may be an SSD or an HDD, and the information processing unit may be a PC, a tablet terminal, a workstation, and the like. The numbers of storage devices and information processing unit may not be one, respectively, but may be two or more. Although the storage device shown in FIG. 2 includes only the tape 11 and the tape drive 12 in which the tape 11 is to be inserted, a tape library which manages and operates a plurality of tapes and in which a plurality of tape drives are installed may be used.

In FIG. 2, the tape drive 12 and the server unit 13 are connected together with a cable or the like; alternatively, they may be connected over a network, such as a local area network (LAN), a wide area network (WAN), or the Internet. The network may be either a wired network or a wireless network.

An example of the tape 11 is a tape cartridge in which magnetic tape is wound around a reel. The tape drive 12 includes an insertion opening through which the cartridge is to be inserted. The tape 11 can be set by inserting the cartridge into the insertion opening. The tape drive 12 reads and writes a file from/to the tape 11 set in the tape drive 12 in response to an instruction from the server unit 13.

The tape drive 12 may include, for example, an input/output I/F that receives an instruction to write and read a file to/from the tape 11 via a file system from an application implemented in the server unit 13; a memory that accumulates files to be written and read files; a head that actually writes and reads files to/from the tape 11; a driving unit that rotates the reel at a regular rotational speed; and a controller that controls the entire tape drive 12.

The server unit 13 may include either one computer or a plurality of computers connected together so that the individual computers execute parallel processing as nodes. The server unit 13 includes a CPU 14 that controls the entire server unit 13, a ROM 15, a RAM 16, a HDD 17, and an input/output I/F 18. They are connected together with a bus 19 for transferring information.

The ROM 15 stores a boot program for starting the server unit 13 and firmware for controlling the tape drive 12 connected to the server unit 13, etc. The RAM 16 provides a working area for the CPU 14 and is used as a cache for the HDD 17 for high-speed processing. The HDD 17 stores an OS and a program for calculating the file read time and providing the calculated read time. The HDD 17 can further store various application programs running on the OS, data necessary for the application programs, etc.

The input/output I/F 18 connects to the tape drive 12 and receives instructions to write and read a file to/from the tape 11 from an application via the file system and outputs the instructions to the tape drive 12. The input/output I/F 18 also transfers a target file to the tape drive 12. The file is read and obtained using the tape drive 12.

The tape 11 stores an index, which is metadata stored in a format that a files system, such as an LTFS, for managing files can use. When the tape 11 is inserted, or mounted, into the tape drive 12, the file system of the server unit 13 reads the index stored in the tape 11 via the input/output I/F 18 and stores the index in a cache. This allows the file system to respond to an inquiry for the file on the tape 11, etc. from an application.

The server unit 13 can further include as hardware an external storage I/F, a network I/F, an input device, a display device, an audio input device, an audio output device, and so on. The external storage I/F is an interface for connecting to an external HDD or the like. The network I/F is an interface for connecting to a network. The input device is a device for inputting data and so on, such as a keyboard and a mouse. The display device is device for displaying the state and result of processing, such as a display.

The server unit 13 may be connected to a network so as to be connected to the computer of a user or an administrator who manages the information providing system 10 via the network.

Figure 3:
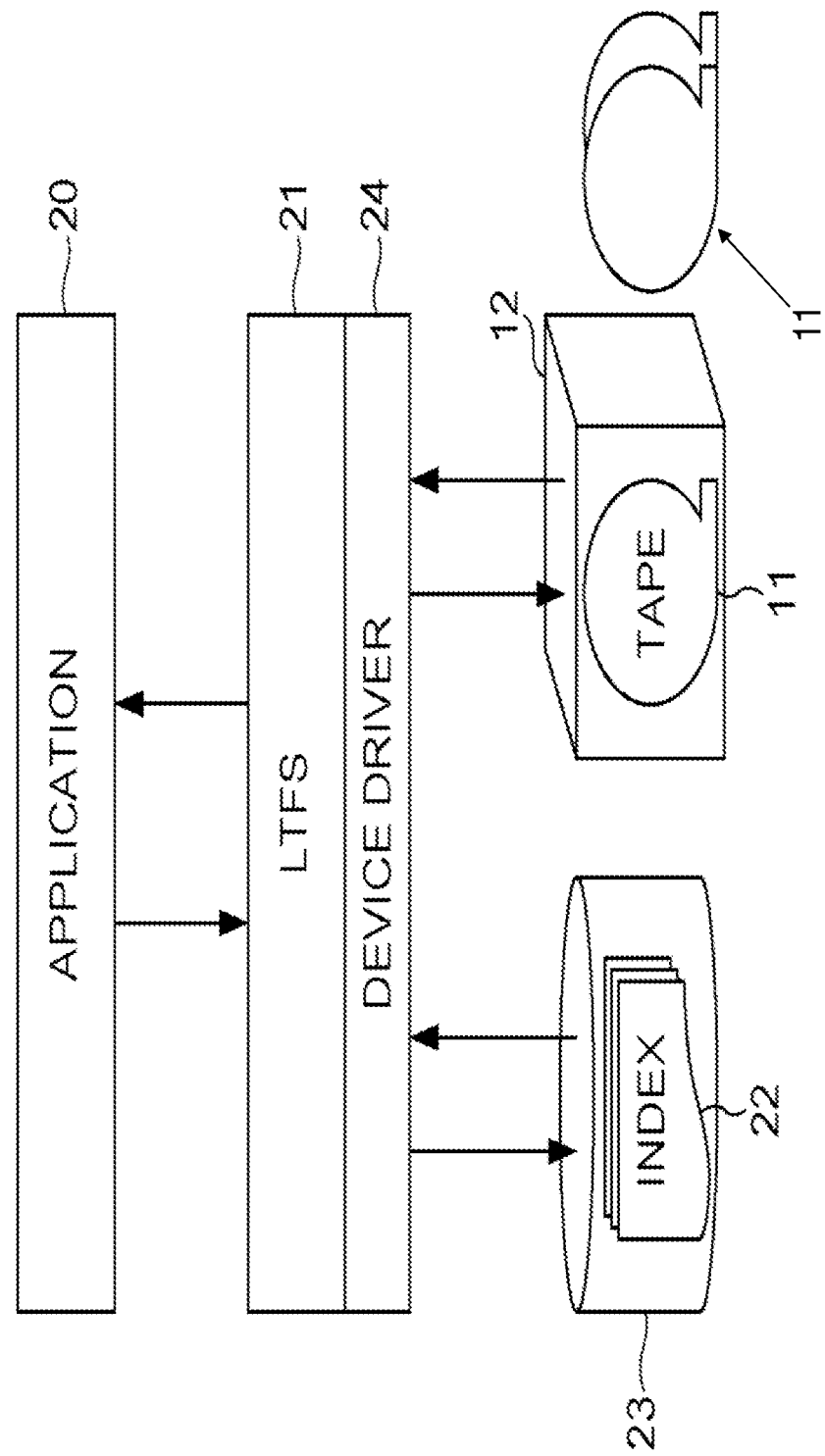
FIG. 3 is a diagram illustrating an example of the software configuration of the information providing system.

FIG. 3 is a diagram illustrating an example of the software configuration of the information providing system 10. The server unit 13 can implement, in addition to the OS, such as a Linux® OS, a Windows® OS, or a Mac® OS, an application 20 running on the OS for requesting to obtain file read time. The application 20 may be any application that requests to obtain the time. The application 20 may be implemented in the computer of the user or the administrator, described above.

The tape 11 includes one or more files written in a format that an LTFS 21 manages and indices 22 that the LTFS 21 manages. The server unit 13 implements, in addition to the application 20 and the LTFS 21, a device driver 24 that allows access to the indices 22 that the LTFS 21 read in a cache 23 and the files on the tape 11. Thus, specifically, an instruction to write or read a file to/from the tape 11 is output from the application 20 to the tape drive 12 via the LTFS 21 and the device driver 24. In FIG. 3, the indices 22 are read and stored in the cache 23.

An example in which a Linux® OS is used will be described. A request to obtain file read time can be made using ioctl (input/output control) system call from the application 20. The ioctl system call can be called by a user process from a user's or administrator's computer and can also be used to change device settings and to read the settings. For a Windows® OS, the same request as with the ioctl system call can be made using a function DeviceIoControl( ).

In the ioctl system call, an ioctl command constant (LTFS_FILE_READ_TIME) can be defined to obtain file read time. For the LTFS 21, a read time calculation function (ltfs_file_read_time( )), which is called using the defined ioctl command constant, is prepared.

The application 20 calls the function in the LTFS 21 with the ioctl system call using file name, file path, ioctl command constant, and the offset and data size of the file as parameters for the ioctl system call. With the function, read time is calculated from the offset and data size of the target data in the file, which are set in the received parameters, and the result is set into a structure and is returned to the application 20.

The application 20 can perform the ioctl system call as needed at file reading to obtain remaining, changing read time, and can display the time on a display device or the like.

Figure 4:
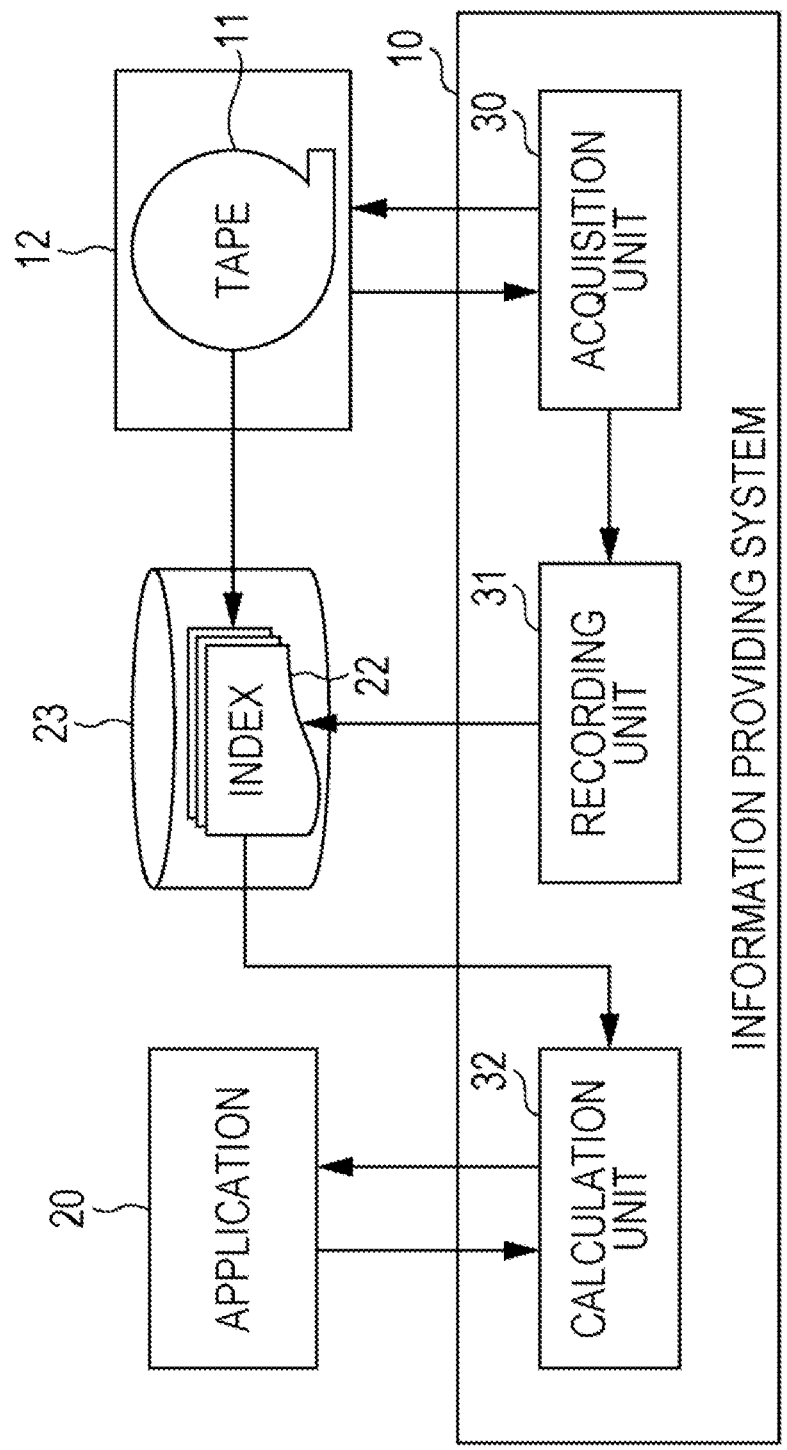
FIG. 4 is a functional block diagram of the information providing system.

FIG. 4 is a functional block diagram for performing the process. The information providing system 10 includes, its functional units, an acquisition unit 30, a recording unit 31, and a calculation unit 32. When a file is recorded in a storage device, such as the tape 11, the acquisition unit 30 obtains information on the recording position of the file. Writing of the file to the tape 11 is performed by the tape drive 12 in response to an instruction from the application 20 via the file system. The acquisition unit 30 obtains the actual position of the file written on the tape 11 by the tape drive 12, specifically, Wrap and LPOS at the start of writing and Wrap and LPOS at the end of writing, from the tape drive 12.

For example, Wrap and LPOS can be obtained from sense data or mode page data indicating the operating state of the tape drive 12 obtained using a small computer system interface (SCSI) command. Alternatively, Wrap and LPOS can be obtained using a method of implementing a command to specify write data and obtain Wrap and LPOS in the tape drive 12. The sense data and the mode page data include, in addition to information on a file recording start position and a file-recording end position, the positional information on the head, from which the Wrap and LPOS of the head can be obtained.

The recording unit 31 writes the information on the recording position of the file obtained by the acquisition unit 30 to an index to be referred to access the file. The LTFS 21 creates extent in the index when recording the data. FIG. 5 is a diagram 100 showing an example of the index. In FIG. 5, the part expressed in boldface is the created extent 104, of which the italic part is the information on the recording position of the file.

The information written to extent includes the offset of the file (fileoffset), the block number at which recording of the file is started (startblock), and the byte count (bytecount), and in addition, a file-recording start position (startwrap, startlpos) and a file-recording end position (endwrap, endlpos).

Referring again to FIG. 4, in response to a request to obtain file read time issued from the application 20, the calculation unit 32 can calculate file read time from the information on the file-recording start position and the recording end position written to the index using calculation expressions described later. The calculation unit 32 can calculate the time until data reading is started and the time from the start of data reading to the end.

The calculation unit 32 can return the calculated times to the application 20 as calculation results so that the application 20 can display the times on a display device. The application 20 can only display the times but also output the times with voice. The times can be displayed on the display of another device connected to the network, for example, the display of a computer that the user or an administrator uses or can be output with voice from an audio output device of the external device, such as a speaker.

Figure 6:
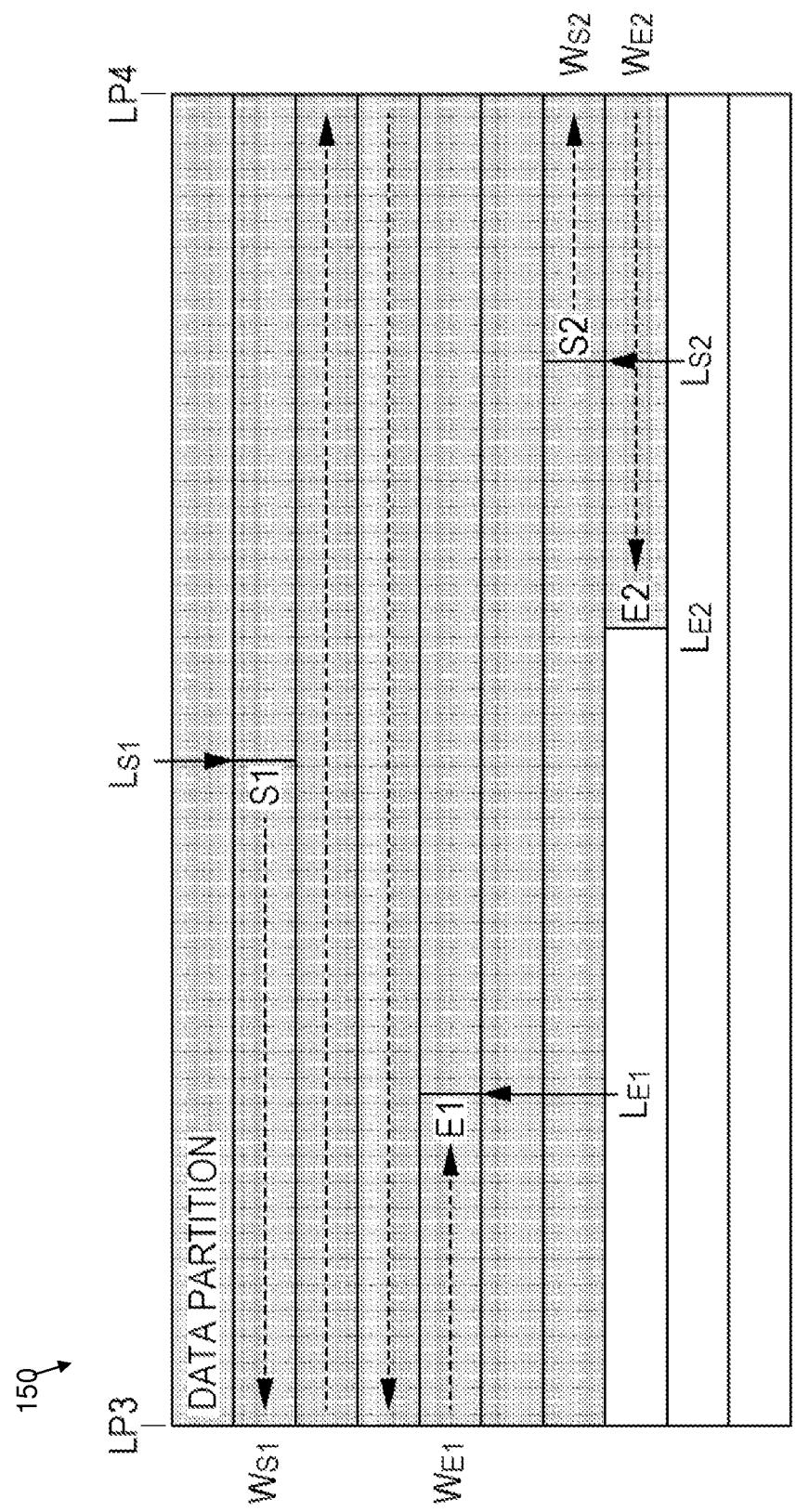
FIG. 6 is a diagram illustrating recording positions of a file recorded on a tape.

Referring to FIG. 6, addition of data to the tape 11 will be described. The tape drive 12 loaded with the tape 11 receives an instruction from the application 20 via the file system and adds data to a designated recording position on the tape 11. The added data is recorded on another block of the tape 11 separate from the previously recorded data, and another extent indicating the position is added to the index. Wrap and LPOS of the newly recorded data are recorded on the extent.

In the example shown in FIG. 6, a diagram 150 is depicted wherein LP3 and LP4 are a recording start position and a recording end position in the data storage area in the longitudinal direction of the tape 11, respectively. In the first Wrap, data is recorded from LP3 to LP4; in the second Wrap, data is reversely recorded from LP4 to LP3; and in the third Wrap, data is recorded from LP3 to LP4. Although data is not recorded from Wrap at the end of the tape 11 in sequence, it is recorded from the top for simplicity.

In FIG. 6, the first data is recorded from position S1 to position E1 on the tape 11, and after another data is recorded, additional data is recorded from position S2 to position E2. Specifically, the first data is recorded in $W_{S1}$ from position S1 to LP3, in the next Wrap, from LP3 to LP4, and in the further next Wrap, from LP4 to LP3, and in $W_{E1}$, from LP3 to position E1. After another data is recorded, additional data is recorded in $W_{S2}$ from position S2 to LP4, and in $W_{E2}$, from LP4 to position E2.

When the first data and additional data are recorded, the acquisition unit 30 obtains information on positions S1 and S2, and after the first data and additional data are recorded, also obtains information on the recording end positions E1 and E2. Specifically, the acquisition unit 30 obtains Wrap=$W_{S1}$ and LPOS=$L_{S1}$ as the information on position S1, and obtains Wrap=$W_{S2}$ and LPOS=$L_{S2}$ as the information on position S2. The acquisition unit 30 further obtains Wrap=$W_{E1}$ and LPOS=$L_{E1}$ as the information on position E1 and obtains Wrap=$W_{E2}$ and LPOS=$L_{E2}$ as the information on position E2.

The recording unit 31 writes the information on the recording positions obtained by the acquisition unit 30 to extent created in the index. The recording unit 31 writes $W_{S1}$ and $L_{S1}$ of the position S1 and $W_{E1}$ and $L_{E1}$ of position E1 to extent in the index of the first data, and writes $W_{S2}$ and $L_{S2}$ of position S2 and $W_{E2}$ and $L_{E2}$ of position E2 to extent of the index of the additional data.

The calculation unit 32 calculates the time to the start of data reading (fileStartReadTime) and the time from the start of data reading to the end (fileLeftReadTime) using Wrap and LPOS recorded on the extent. The fileStartReadTime on the first data recorded in position S1 to position E1 can be calculated using the following Eq. 1, and the fileLeftReadTime can be calculated using the following Eq. 2.

$$fileStartReadTime = T_{WC}(0 \to W_{S1}) + \frac{|L_{S1} - lp3|}{S_L} \quad [\text{Eq. 1}]$$

$$fileLeftReadTime = \sum_{W=W_{S1}}^{W_{E1}-1} T_{WC}(W \to W+1) + \quad [\text{Eq. 2}]$$
$$\frac{f(W_{E1}, W_{S1}) \times (W_{E1} - W_{S1} - 1) \times (lp4 - lp3)}{S_R} +$$
$$\frac{g(W_{E1}, W_{S1}) \times (|L_{S1} - l(W_{S1})| + |L_{E1} - l(W_{E1}+1)|)}{S_R} +$$
$$\frac{(1 - g(W_{E1}, W_{S1})) \times |L_{E1} - L_{S1}|}{S_R}$$

In Eq. 1 and Eq. 2, LP3 and LP4 are LPOS of LP3 and LP4, respectively; SR(LPOS/s) is the reading speed; SL(LPOS/s) is the speed of the head moving to a predetermined position on the tape 11 during seeking; and $T_{WC}(W_n \to W_m)$ is the function of the time taken to move from Wrap n to Wrap m. At any Wrap W, l(W) is a function which is LP3 when LPOS at an end in the data recording direction is LP3, and which is LP4 when the LPOS is LP4; $f(W_{En}, W_{Sn})$ is a function which is 1 when the difference between Wrap=$W_{En}$ at the recording end position and Wrap=W Sn at the recording start position is greater than 1, and otherwise, which is 0; and $g(W_{En}, W_{Sn})$ is a function which is 0 when $W_{En}$ and $W_{Sn}$ are the same, and otherwise, which is 1. When the tape 11 is loaded, the head is at LP3. Thus, not the function l(W) but LP3 is used in Eq. 1.

Eq. 1 is an expression in which the time taken for the head to move from the initial position Wrap=0 to Wrap of the recording start position and the time taken to move from LP3 to any LPOS are added. Eq. 2 is an expression in which the time taken to transit Wrap if Wrap transits, the time taken to read data from end to end if Wrap transits and data is recorded from end to end in the same Wrap, the time taken to read data from the recording start position to the end and from the end to the recording end position if Wrap transits and data is not recorded from end to end in the same Wrap, and the time taken to read data from the recording start position to the recording end position if Wrap does not transit are added together.

Eq. 2 can be applied not only to the first data but also to additional data, allowing calculation of the time from the start of reading the additional data to the end. The time from the start of reading the file to the end includes, in addition to the time taken to read the first data and the additional data, the time taken for the head to move from the first-data recording end position to the additional-data recording start position. The time to the end of reading the file including this time (fileLeftReadTime) can be obtained using Eq. 3. In Eq. 3, N is the number of the last extent.

$$fileLeftReadTime = \sum_{n=0}^{N} \sum_{W=W_{Sn}}^{W_{En}-1} T_{WC}(W \to W+1) + \quad [\text{Eq. 3}]$$
$$\sum_{n=0}^{N} \frac{f(W_{En}, W_{Sn}) \times (W_{En} - W_{Sn} - 1) \times (lp4 - lp3)}{S_R} +$$
$$\sum_{n=0}^{N} \frac{g(W_{En}, W_{Sn}) \times (|L_{Sn} - l(W_{Sn})| + |L_{En} - l(W_{En}+1)|)}{S_R} +$$
$$\sum_{n=0}^{N} \frac{(1 - g(W_{En}, W_{Sn})) \times |L_{En} - L_{Sn}|}{S_R} +$$
$$\sum_{n=0}^{N-1} \left( T_{WC}(W_{En} \to W_{Sn+1}) + \frac{|L_{En} - L_{Sn+1}|}{S_L} \right)$$

The time taken to read all additional data from the first data can be calculated using Eq. 3. If the tape 11 has already been mounted, the position of the head for use in writing and reading data is sometimes in an intermediate point on the tape 11. In this case, if an instruction to obtain file read time is received from the application 20, the head has to be moved from the intermediate point of the data to the file-reading start position.

Figure 7:
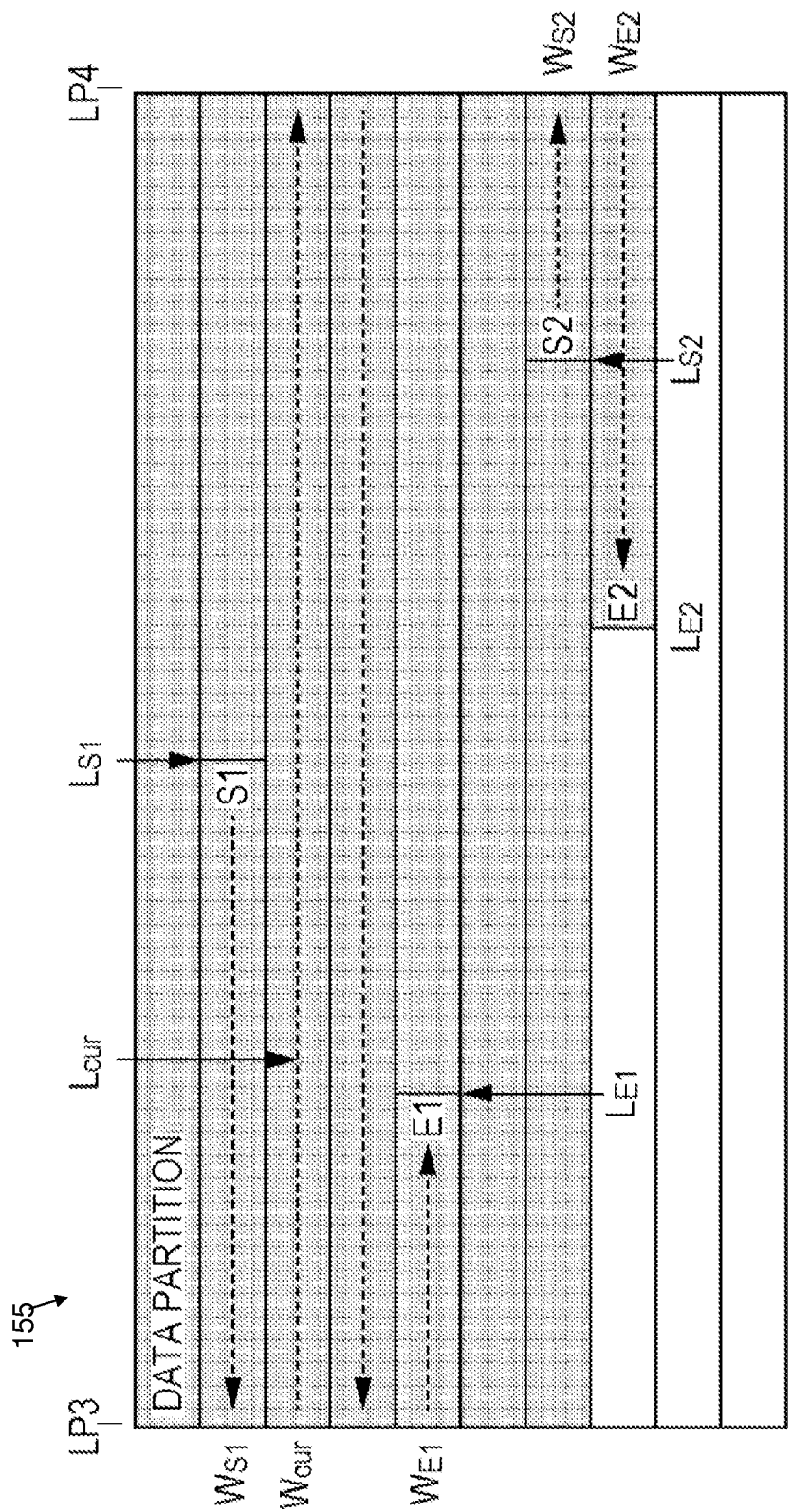
FIG. 7 is a diagram illustrating recording positions of a file recorded on a tape.

The head in this case is located on a point ($W_{cur}$, $L_{cur}$) on a table on which data corresponding to extent k is recorded, as shown in FIG. 7 in diagram 155. The data corresponding to extent k may be either the first data or additional data. If the head is at an intermediate point of data, the time taken to return from the point to S1 can be obtained using Eq. 4.

$$fileStartReadTime = T_{WC}(W_{cur} \to W_{S1}) + \frac{|L_{cur} - L_{S1}|}{S_L} \quad [\text{Eq. 4}]$$

The time taken to read the file can be obtained by adding fileLeftReadTime in Eq. 2 and Eq. 3 to the time taken to return to S1.

If sequential read time is required, and the time is calculated for provision, the time taken from an intermediate point to the end of reading has to be calculated and provided. The time taken to read extent data from an intermediate point to the recording end position can be calculated using Eq. 5 using the recording end position Wrap=$W_{Ek}$ and LPOS=$L_{Ek}$.

$$fileLeftReadTime(cur \to k) = \sum_{W=W_{cur}}^{W_{Ek}-1} T_{WC}(W \to W+1) + \quad [\text{Eq. 5}]$$
$$\frac{f(W_{Ek}, W_{cur}) \times (W_{Ek} - W_{cur} - 1) \times (lp4 - lp3)}{S_R} +$$
$$\frac{g(W_{Ek}, W_{cur}) \times (|L_{cur} - l(W_{cur})| + |L_{Ek} - l(W_{Ek}+1)|)}{S_R} +$$
$$\frac{(1 - g(W_{Ek}, W_{cur})) \times |L_{Ek} - L_{cur}|}{S_R}$$

The time taken to read remaining data corresponding to extent k+1 to extent N can be calculated using Eq. 6.

$$fileLeftReadTime(k+1 \to N) = \sum_{n=k+1}^{N} \sum_{W=W_{Sn}}^{W_{En}-1} T_{WC}(W \to W+1) + \quad [\text{Eq. 6}]$$

-continued $$\sum_{n=k+1}^{N} \frac{f(W_{En}, W_{Sn}) \times (W_{En} - W_{Sn} - 1) \times (lp4 - lp3)}{S_R} +$$

$$\sum_{n=k+1}^{N} \frac{g(W_{En}, W_{Sn}) \times (|L_{Sn} - l(W_{Sn})| + |L_{En} - l(W_{En} + 1)|)}{S_R} +$$

$$\sum_{n=k+1}^{N} \frac{(1 - g(W_{En}, W_{Sn})) \times |L_{En} - L_{Sn}|}{S_R} +$$

$$\sum_{n=k+1}^{N-1} \left( T_{WC}(W_{En} \rightarrow W_{Sn+1}) + \frac{|L_{En} - L_{Sn+1}|}{S_L} \right)$$

The time taken to read remaining data from the intermediate point to the end can be obtained by adding the time given by Eq. 5 and the time given by Eq. 6. The calculation unit 32 can perform sequential computation using Eq. 5 and Eq. 6 and sequentially provide changing remaining read time to the requestor that requests the time.

Although the time taken to read remaining data is obtained in this way, the present invention is not limited thereto; the time taken to read remaining data may be obtained by obtaining the time taken to read the entire data using Eq. 2 and the time taken to read to an intermediate point and obtaining the difference therebetween.

Figure 8:
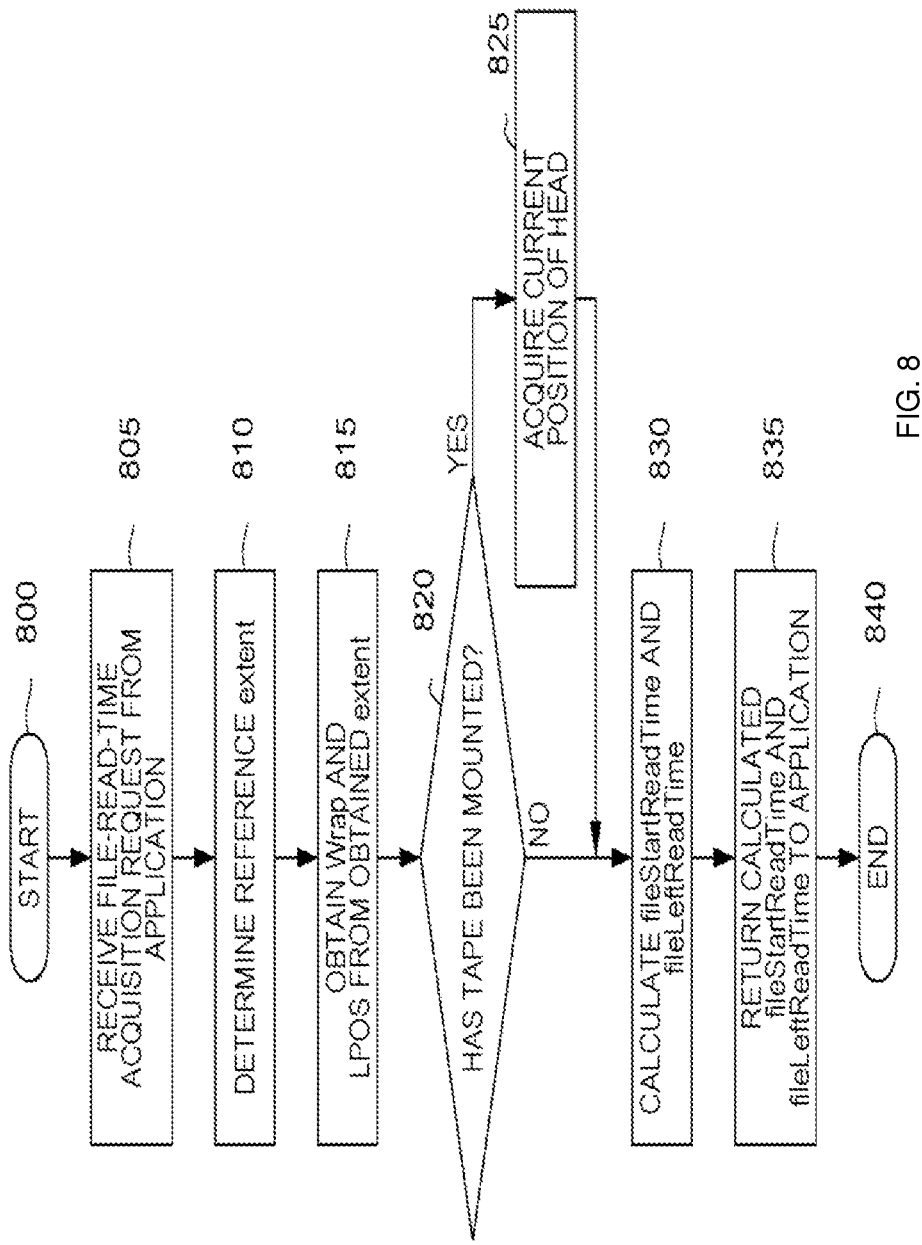
FIG. 8 is a flowchart for a process performed by the information providing system.

Referring to FIG. 8, a flowchart for a process performed by the information providing system 10 will be described. The process is started from step 800. At step 805, the information providing system 10 receives a request to obtain file read time, in which file name, the offset of the file, and the length of data are specified, from the application 20, which is a requestor that issues the request. Specifically, the information providing system 10 receives an inquiry using ioctl system call with the above parameters.

At step 810, extent to be referred to in the index is determined on the basis of the file name, file offset, and data length specified in the request. The index includes extent to which the offset of the file is written, in addition to the attribute information, such as the file name and data length. This allows reference extent to be determined on the basis of the attribute information and so on.

At step 815, information on the recording start position and the recording end position of the data is obtained from the determined extent. Specifically, Wrap and LPOS at the start of reading and Wrap and LPOS at the end of reading are obtained. At step 820, it is determined whether the tape 11 has been mounted. When the tape 11 is mounted, the process goes to step 825, at which the current position of the head is acquired from the information obtained from the tape drive 12, and goes to step 830. When the tape 11 is not mounted, the process goes directly to step 830. The current position of the head can be obtained as information on Wrap and LPOS from sense data or the like obtained in response to the SCSI command.

At step 830, fileStartReadTime and fileLeftReadTime are calculated from information on a predetermined initial position or the current position of the head and information on the file-recording start position and the recording end position of the file using the above equations. At step 835, the calculation unit 32 returns the calculated fileStartReadTime and fileLeftReadTime to the requester application 20. The application 20 displays the information on a display device, such as a display, and at step 840, the information providing system 10 terminates the process.

Although the foregoing embodiment has been described as applied to a case where the time taken to read a file from the single application 20 is requested, one file can be read from a plurality of applications. In this case, the applications can inquire about read time as the need arises and return estimated read time at the time of inquiry.

Once a tape that can be accessed from a plurality of nodes is mounted, the index thereof is stored on a shared disk shared by the plurality of nodes. Thus, when the same file is to be read from the individual applications of the nodes, information on extent in the index stored in the shared disk can be read, and file read time can be calculated.

When a tape library in which a plurality of tapes and a plurality of drives are installed is used, if a target tape is not mounted, the time for the tape to be moved to a tape drive and set therein is needed. Thus, for the tape that is not mounted, the moving time in the library can be added to fileStartReadTime.

The moving time in the library can be set to extended attributes of the file. In this case, the set time can be obtained with reference to the extended attributes and can be added to fileStartReadTime. This time may be set in advance, may be regularly calculated for setting, or may be set in response to a request.

Not only the moving time in the library but also the time to read a file that is not mounted may be calculated in advance and may be set in the extended attributes of the file. This allows correct time taken to read the file to be provided faster.

If a Unix® OS is used, the values set in the extended attributes of the file can be read in response to "attr-g" command, which is a system command. If a Windows® OS is used, the values set in the extended attributes of the file can be read using an application programming interface (API). If Windows® OS is used, software called IBM LTFS Tools (provided by IBM) that provides the function of reading extended attributes can be used.

The cache 23 can be used as storage means for storing an index read from the tape 11. The calculation unit 32 can calculate the time taken to read the file using the index. A determination unit may be provided to determine whether the tape 11 is mounted or not. Another determination unit may be provided so that, if it is determined that the tape 11 is mounted, it can be determined whether the head is on the tape 11 on which a file is recorded.

Thus, file read time can be provided without the need for accessing tape as need arises by recording the physical recording start position and recording end position of the file on the tape on the extent of the index, and if a request for file read time is given, by reading the information on the positions from the extent and calculating the read time and returning it. Even for a file in which additional data is recorded at intervals, correct read time can be provided.

Thereby, in the embodiments of the present disclosure described above, a system and method is provided for providing correct time taken to read a file recorded on a storage device without the need for accessing the storage device as the need arises. The system is an information providing system for providing time taken to read a file. The system includes acquisition means, embodied as an acquisition unit, for obtaining information on a recording position of a file when the file is recorded in a storage device; recording means, embodied as a recording unit, for writing information on the obtained recording position to an index referred to access the file; and calculation means, embodied as a calculating unit, for calculating time taken to read the file using the information on the recording position written to the index in response to a request to obtain the time taken to read the file and providing the calculated time to a requestor that requests the time.

Although a system, a method, and a program for providing information according to embodiments of the present invention have been described in detail with reference to the drawings, it is to be understood that modifications can be made within the scope that those skilled in the art can consider, for example, other embodiments, addition, changes, and deletion, and that any forms are included in the scope of the present invention provided that they offer the operational advantages of the present invention. Accordingly, a recording medium for recording the above program and a server unit that provides the program via a network or the like can also be provided.

What is claimed is:

1. An information providing system, including a computer, for providing time taken to read a file, comprising:
    an acquisition unit for obtaining information on a recording position of a file when the file is recorded in a storage device, the storage device being a mountable magnetic tape medium;
    a recording unit for writing information on the obtained recording position to an index, the index being referred to when accessing the file, and when accessing the file the obtained recording position being written to the index contemporaneously with the file being recorded in the storage device, the recording position of the file written to the index being recorded separate from the recorded file, and the index which includes the recording position being stored in another storage device other than with the recorded file, the recording position of the file being an actual position of the file recorded in the storage device and the actual position being obtained using the acquisition unit, the actual position includes a WRAP (lateral direction perpendicular to the longitudinal direction) and LPOS (longitudinal direction of a tape) at the start of writing and WRAP and LPOS at the end of writing;
    a calculation unit for calculating time taken to read the file using the information on the recording position written to the index in response to a request to obtain the time taken to read the file, when the tape medium is not mounted, the calculating of the time taken to read the file including a recording start position and a recording end position for the file written to the index, the calculation unit calculating the time from the start position of data reading to the end position using the recorded start position and the recorded end position written to the index without subsequently accessing the storage device after receiving the request to obtain the time taken to read the file; and
    providing the calculated time to a requestor that initiated the request to obtain the time to read the file when the tape medium is not mounted, thereby providing the calculated time to read the file without accessing the storage device after receiving the request to obtain the time taken to read the file.

2. The information providing system according to claim 1, wherein
    the storage device is a magnetic tape medium; and
    the acquisition unit obtains, information on a recording start position of the file and information on a recording end position of the file from a tape drive that records the file in the magnetic tape medium.

3. The information providing system according to claim 2, wherein the recording position of the file includes a recording start position and a recording end position of the file in a longitudinal direction of the magnetic tape medium and a recording start position and a recording end position of the file in a lateral direction perpendicular to the longitudinal direction of the magnetic tape medium.

4. The information providing system according to claim 1, further comprising:
    another storage device for storing the index read from the storage device,
    wherein the calculation unit calculates the time taken to read the file using the index stored in the storage means.

5. The information providing system according to claim 1, wherein the calculation unit calculates first time taken to start reading data on the file and second time from start of reading of the data to end of the reading and provides the first time and the second time as the time taken to read the file.

6. The information providing system according to claim 1, wherein
    the file includes first data and one or more pieces of second data added to the first data;
    the acquisition unit obtains information on the recording position for each of the first data and the one or more pieces of second data;
    the recording unit writes the information on the recording positions to the index; and
    the calculation unit calculates the time taken to read the file by adding times taken to read the first data and the one or more pieces of second data together.

7. The information providing system according to claim 2, further comprising:
    a first determination unit that determines whether the magnetic tape medium is mounted; and
    a second determination unit that, if it is determined that the magnetic tape medium is mounted, determines whether a head that the tape drive uses for reading and writing is present on the magnetic tape medium on which the file is recorded,
    wherein if it is determined that the head is present on the magnetic tape medium, the calculation unit calculates time taken to read a remainder of the file, with a current position of the head as a reading start position of the file.

8. The information providing system according to claim 7, wherein
    the index includes information on time taken to move the magnetic tape medium to mount the magnetic tape medium; and
    if the first determination unit determines that the magnetic tape medium is not mounted, the calculation unit calculates the time taken to read the file by adding the time taken to move the magnetic tape medium.

9. A method executed by an information providing system for providing time taken to read a file, the method comprising:
    obtaining information on a recording position of a file when the file is recorded in a storage device, using an acquisition unit, the storage device being a mountable magnetic tape medium;
    writing information on the obtained recording position to an index, the index being referred to when accessing the file, and when accessing the file the obtained recording position being written to the index contemporaneously with the file being recorded in the storage device, the recording position of the file written to the index being recorded separate from the recorded file, and the index which includes the recording position being stored in another storage device other than with the recorded file;

obtaining an actual position of the file recorded in the storage device, using the acquisition unit, for the recording position of the file, the actual position includes a WRAP (lateral direction perpendicular to the longitudinal direction) and LPOS (longitudinal direction of a tape) at the start of writing and WRAP and LPOS at the end of writing;

calculating time taken to read the file using the information on the recording position written to the index in response to a request to obtain the time taken to read the file, when the tape medium is not mounted, the calculating of the time taken to read the file including a recording start position and a recording end position for the file written to the index, the calculation unit calculating the time from the start position of data reading to the end position using the recorded start position and the recorded end position written to the index without subsequently accessing the storage device after receiving the request to obtain the time taken to read the file; and providing the calculated time to a requestor that initiated the request to obtain the time to read the file when the tape medium is not mounted, thereby providing the calculated time to read the file without accessing the storage device after receiving the request to obtain the time taken to read the file.

10. The method according to claim 9, wherein
the storage device is a magnetic tape medium; and
in the acquisition step, information on a recording start position of the file and information on a recording end position of the file are obtained as the information on the recording position of the file from a tape drive that records the file in the magnetic tape medium.

11. The method according to claim 10, wherein the recording position of the file includes a recording start position and a recording end position of the file in a longitudinal direction of the magnetic tape medium and a recording start position and a recording end position of the file in a lateral direction perpendicular to the longitudinal direction of the magnetic tape medium.

12. The method according to claim 9, further comprising:
storing the index read from the storage device in another storage device,
wherein in the calculation step, the time taken to read the file is calculated using the index stored in the another storage device.

13. The method according to claim 9, wherein
in the calculation step, first time taken to start reading data on the file and second time from start of reading of the data to end of the reading are calculated; and
in the providing step, the first time and the second time are provided as the time taken to read the file.

14. The method according to claim 9, wherein
the file includes first data and one or more pieces of second data added to the first data;
in the acquisition step, information on the recording position is obtained for each of the first data and the one or more pieces of second data;
in the writing step, the information on the recording positions is written to the index; and
in the calculation step, the time taken to read the file is calculated by adding times taken to read the first data and the one or more pieces of second data together.

15. The method according to claim 10, further comprising:
determining whether the magnetic tape medium is mounted; and
when it is determined that the magnetic tape medium is mounted, determining whether a head that the tape drive uses for reading and writing is present on the magnetic tape medium on which the file is recorded,
wherein, when it is determined that the head is present on the magnetic tape medium, time taken to read a remainder of the file is calculated, with a current position of the head as a reading start position of the file.

16. The method according to claim 15, wherein
the index includes information on time taken to move the magnetic tape medium to mount the magnetic tape medium; and
in the step of determining whether the magnetic tape medium is mounted, when it is determined that the magnetic tape medium is not mounted, then in the calculation step, the time taken to read the file is calculated by adding the time taken to move the magnetic tape medium.

17. A computer program product for providing time taken to read a file, the computer program product comprising a computer readable storage medium having program instructions embodied therewith, the program instructions executable by a computer to cause the computer to perform a method, comprising:
obtaining information on a recording position of a file when the file is recorded in a storage device, using an acquisition unit, the storage device being a mountable magnetic tape medium;
writing information on the obtained recording position to an index, the index being referred to when accessing the file, and when accessing the file the obtained recording position being written to the index contemporaneously with the file being recorded in the storage device, the recording position of the file written to the index being recorded separate from the recorded file, and the index which includes the recording position being stored in another storage device other than with the recorded file, the recording position of the file being an actual position of the file recorded in the storage device and the actual position being obtained using the acquisition unit, the actual position includes a WRAP (lateral direction perpendicular to the longitudinal direction) and LPOS (longitudinal direction of a tape) at the start of writing and WRAP and LPOS at the end of writing;
calculating time taken to read the file using the information on the recording position written to the index in response to a request to obtain the time taken to read the file, when the tape medium is not mounted, the calculating of the time taken to read the file including a recording start position and a recording end position for the file written to the index, the calculation unit calculating the time from the start position of data reading to the end position using the recorded start position and the recorded end position written to the index without subsequently accessing the storage device after receiving the request to obtain the time taken to read the file; and
providing the calculated time to a requestor that initiated the request to obtain the time to read the file when the tape medium is not mounted, thereby providing the calculated time to read the file without accessing the storage device after receiving the request to obtain the time taken to read the file.

18. The program product according to claim 17, wherein the storage device is a magnetic tape medium; and in the acquisition step, information on a recording start position of the file and information on a recording end position of the file are obtained as the information on the recording position of the file from a tape drive that records the file in the magnetic tape medium.

19. The program product according to claim 18, wherein the recording position of the file includes a recording start position and a recording end position of the file in a longitudinal direction of the magnetic tape medium and a recording start position and a recording end position of the file in a lateral direction perpendicular to the longitudinal direction of the magnetic tape medium.

20. The program product according to claim 17, the method further comprising:

storing the index read from the storage device in another storage device, wherein in the calculation step, the time taken to read the file is calculated using the index stored in the another storage device.

* * * * *